United States Patent [19]

Bergkvist

[11] Patent Number: 4,474,430
[45] Date of Patent: Oct. 2, 1984

[54] LEADING MARK

[76] Inventor: Lars A. Bergkvist, Västmansvägen 16, 890 23 Själevad, Sweden

[21] Appl. No.: 385,385
[22] PCT Filed: Sep. 17, 1981
[86] PCT No.: PCT/SE81/00266
 § 371 Date: May 17, 1982
 § 102(e) Date: May 17, 1982
[87] PCT Pub. No.: WO82/01078
 PCT Pub. Date: Apr. 1, 1982

[30] Foreign Application Priority Data

Sep. 22, 1980 [SE] Sweden .................................. 8006622

[51] Int. Cl.³ ............................................. G02B 27/60
[52] U.S. Cl. ..................... 350/322; 350/374; 350/401
[58] Field of Search ................ 350/322, 321; 356/374, 356/401; 250/237 G

[56] References Cited

U.S. PATENT DOCUMENTS 3,604,813  9/1971  Te Kronnie et al. ............... 356/374
4,166,699  9/1979  Bergkvist ............................ 356/153
4,242,000  12/1980 Bergkvist ............................ 356/374

Primary Examiner—Jon W. Henry
Attorney, Agent, or Firm—Silverman, Cass & Singer

[57] ABSTRACT

An instrument for marking leading lines, comprising a front screen and a behind screen (1,2,15,16), which include opaque lines (3) separated by transparent interstices (4), whereby an interference pattern, a so-called moiré pattern, arises when viewing the instrument. The screens have different division, i.e. different distances between the opaque lines.

According to the invention, each of the screens (1,2,15,16) comprises a plate, which at its center is bent to an obtuse angle (v), which screen plates are positioned by means of attachment means (6,7,8) so that the obtuse angles (v) face toward each other, in which case the front screen plate (1) is provided with a denser screen division than the behind screen plate (2), or alternatively so that the obtuse angles (v) face away from each other, in which case the front screen plate (15) is provided with a sparser screen division than the behind screen plate (16).

10 Claims, 6 Drawing Figures

U.S. Patent    Oct. 2, 1984    4,474,430
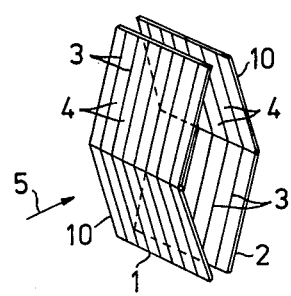
FIG.1
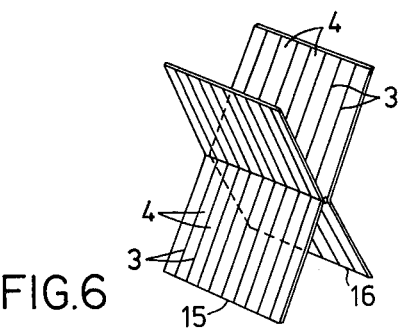
FIG.6
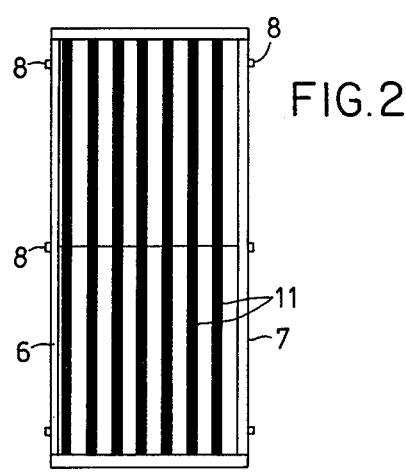
FIG.2
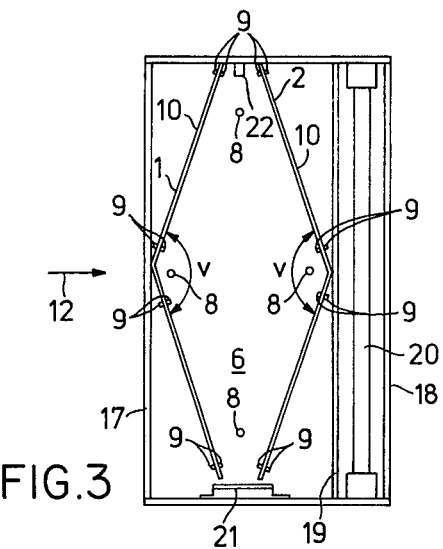
FIG.3
FIG.4
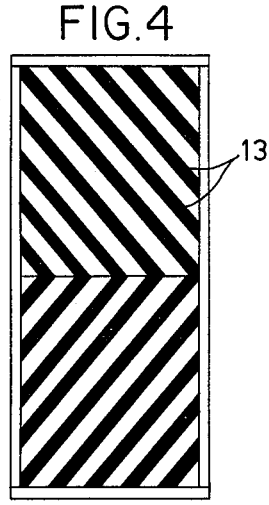
FIG.5
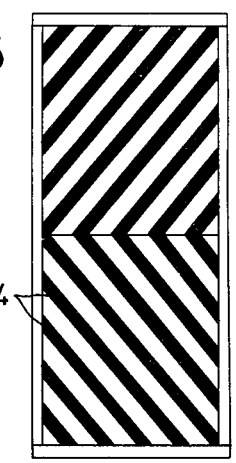

LEADING MARK

This invention relates to a leading mark, more precisely to an instrument for marking a definite direction for an observer.

Instruments utilizing light interference technique for indicating a plane are previously known a.o. through the Swedish patent specifications Nos. 7611513-8 and 354 354, which relate to an instrument utilizing moiré technique for bringing about for an observer the indication of a certain horizontal or vertical plane.

The instrument according to said patents comprises three screens, each of which consists of opaque lines separated by transparent interstices. When viewing the instrument, indication is obtained that the observer is outside a certain plane defined by the instrument, in that an interference pattern, a so-called moiré pattern arises which includes lines with a discontinuous angular deviation.

In the Swedish patent specification No. 354 354 an instrument is disclosed, at which two screen plates are provided angularly relative one another, and the division of the screens, i.e. the number of opaque lines per length unit perpendicular to the opaque lines, are selected so that an interference pattern arises which is to be read in respect of the symmetry of the pattern.

An accurate determination of the indicated plane by means of such a pattern is extremely difficult.

The instruments above referred to per se render a very high accuracy, but this type of indication does not meet certain requirements for leading marking.

One of these requirements is that upon viewing the instrument it must be clearly apparent therefrom, in a simple way, preferably by marking in the form of arrows, in which direction a deviation from the leading line prevails.

A further requirement is very uniform quality in respect of the active elements of the instruments and of their location, in order thereby to obtain identical interference patterns produced by different instruments for the same deviation from the leading line.

The present invention solves the aforesaid problems by a combination of the design of the screens and their attachment means. The screens according to the invention are formed so that the precision of the position in a first direction is less essential, and so that the necessary precision in respect of their position in a direction perpendicular to the first direction is obtained automatically by the attachment means.

The present invention relates to an instrument for marking leading lines, comprising a front screen and a behind screen, which include opaque lines separated by transparent interstices, in such a manner, that upon viewing the instrument an interference pattern, a so-called moiré pattern, arises, said screens having different division, i.e. different distances between the opaque lines. The invention is characterized in that each of said screens comprises a plate, which centrally is bent to form an obtuse angle, that two such screen plates are positioned by attachment means so that the obtuse angles either face toward each other, in which case the front screen plate is provided with a screen division of greater density than the behind screen plate, or alternatively so that the obtuse angles face away from each other, in which case the front screen plate is provided with a screen division more sparse than the behind screen plate.

The invention is described in greater detail in the following, with reference to the accompanying drawings, in which FIGS. 1 and 6 schematically show screen settings according to the invention, FIG. 2 shows the instrument seen along its stated leading line, FIG. 3 is a view where the right-hand side piece in FIG. 2 has been removed, FIG. 4 shows the instrument observed to the left of its stated leading line, FIG. 5 shows the instrument observed to the right of its stated leading line.

In FIG. 1 a screen setting according to the invention is shown schematically, where each screen 1,2 includes opaque lines 3 separated by transparent interstices 4. The screens 1,2 are arranged overlapping so that an observer viewing the screens from a direction indicated schematically by the arrow 5 looks through front and behind screens. Hereby an interference pattern, a so-called moiré pattern, is formed when viewing the instrument.

The screens 1,2 have different division, i.e. different numbers of opaque lines per length unit perpendicular to the opaque lines.

Each screen 1,2 comprises a plate, which at its centre is bent to form an obtuse angle v, see FIG. 3.

The angle v may be between 120° and 170°, or below or above these values, depending on the desired sensitivity, as will be explained below.

According to one embodiment of the invention, two such screen plates 1,2 are positioned so that the obtuse angles face toward each other, as shown in FIG. 1, and according to a second embodiment said plates are positioned so that the said angles face away from each other, as shown in FIG. 6.

According to the firstmentioned embodiment, the front screen plate 1 is provided with a division, which is more dense than that of the behind screen plate 2.

For employing the instrument within a preferred distance interval from about 25 to 250 m, the opaque lines 3 of the front screen, for example, may have a width of 3 mm while the distance between two adjacent opaque lines, i.e. the transparent interstice 4 has a width of 1.5 mm. The opaque lines 3 of the behind screen 2 also have a width of 3 mm while its transparent interstices have a width of 1.75 mm. These measurement values are stated only as example.

The screen plates 1,2 are supported by attachment means, which comprise two lateral pieces 6,7, for example metal sheets or corresponding ones, which are arranged in parallel with each other and perpendicularly to the plane surfaces of the screen plates 1,2.

The screen plates 1,2 are clamped between the lateral pieces 6,7 by means of set bolts 8 or corresponding means extending between the lateral pieces 6,7.

The lateral pieces 6,7 are provided with indications in the form of upright pins 9 or the like arranged in pairs, or in the form of grooves. Between each pair of indications the edge 10 of a screen plate 1,2 extends.

The screen plates 1,2 are rectangular or square plane plates, which after having been provided with a screen extending in parallel with two sides are bent to the angle v perpendicular to the screen lines. This implies that each screen plate 1,2 has parallel sides where every screen line is in parallel with two opposed sides.

Each of the screen plates 1,2 includes in respect of the plate a symmetrically located opaque line 3 or a transparent interstice 4.

When, thus, the screen plates 1,2 are positioned as shown schematically in FIG. 1 and are surrounded by the lateral pieces 6,7 and inserted between the pairs of indications 9, the screens are located so that their screen lines 3 are in parallel with each other, and so that said symmetrically located opaque line 3 or said transparent interstice 4 are located directly in front of each other, seen in a direction of observation which is perpendicular to the plane surfaces of the screen plates 1,2.

It is extremely essential that the screen lines 3,4 are in parallel relative to each other, and that the position of said symmetric line 3 or interstice 4 is such as stated above, in order to give rise to the formation of an interference pattern consisting of dark strips 11 in parallel relative to each other, as shown in FIG. 2, when the instrument is viewed perpendicularly to the plane surfaces of the screen plates 1,2 in a direction of observation indicated by the arrow 12 in FIG. 3, i.e. along the leading line shown by the instrument.

The interference pattern or the accuracy expressed as the deviation from the leading line where the interference pattern shown in FIG. 2 is disturbed, is affected relatively little by the fact that the screen plates 1,2 are slightly offset in vertical direction from the position shown in FIG. 3.

The first direction mentioned in the introductory portion above is to be understood as a vertical displacement in FIG. 2 of one screen plate relative to the second one. The second direction mentioned above in the introductory portion is to be understood as a displacement perpendicularly to the plane of the paper in FIG. 2, so that the position of the symmetric lines is not the one intended.

Due to the fact that the screen plates 1,2 are plane rectangular plates, which are provided with screen lines 3,4 extending in parallel with two sides and thereafter are bent to a definite angle, thus, a high accuracy of the instrument, also in respect of the angle v, is obtained when the screens are clamped between the plane lateral pieces 6,7.

The afore-described screen plates 1,2, in a setting according to FIGS. 1 and 3, yield an interference picture as shown schematically in FIG. 2 when the instrument is viewed along its leading line, i.e. in a direction perpendicular to the plane surfaces of the screen plates 1,2.

When the instrument according to FIGS. 1 and 3 is viewed from a direction located to the left of the leading line, the interference pattern shown in FIG. 4 is formed. It also consists of dark strips 13, but these strips 13 form arrows, which indicate the correction direction for coming to the leading line. When the instrument is viewed from a direction located to the right of the leading line, in a corresponding manner the interference pattern shown in FIG. 5 is formed which consists of arrows formed of dark strips 14 which also indicate the correction direction.

By designing the screen plates 1,2 and by positioning them as stated above, a simple and accurate instrument for marking leading lines and for indicating the correction direction is obtained.

When the screen plates are set as shown in FIG. 6, where the screen plates are designated 15,16, the front screen plate 15 is provided with a screen having a division sparser than that of the behind screen 16. The screen divisions here may be such as stated above. Hereby the interference patterns in FIGS. 4 and 5 form in connection to the deviations from the leading line described in these Figures.

The angle v affects the sensitivity of the instrument. At a small angle v the interference pattern consisting of arrows forms for a very small deviation from the leading line. When the angle v is greater, this sensitivity is lower. Practical tests have shown that for an intended distance interval of 25 to 250 m an angle v of 145° is to be preferred.

In the foregoing the terms leading line and leading mark have been used. These terms were used in order to express that the instrument alone, i.e. without using a further instrument or mark, shows a specific line when viewing the instrument, and also to express that the instrument is intended to be preferably used for indicating leading lines, especially for navigation.

According to FIGS. 2 and 3, the instrument comprises, in addition to what was mentioned above, a front piece 17 of a transparent material, for example a plastic material, and a rear piece 18, preferably of sheet metal. It further comprises preferably an inner wall 19 of transparent material, for example plastic material, which inner wall is intended to serve as a diffusor for the light emitted by one or several light sources, preferably fluorescent tubes 20, which are located between the inner wall 19 and the rear piece 18. In order to increase the contrast of the interference pattern, the light sources are capable to emit yellow light. Alternatively the light sources 20 are capable to emit white light while the inner wall 19 is coloured so as to emit yellow light to the screen plates 1,2.

An electric heating element 21 of known type further may be provided for heating the instrument and thereby to prevent frost formation when the instrument is placed outdoors. When using a heating element 21, preferably a thermostat 22 is located in the upper part of the instrument for controlling the temperature within the instrument.

The present invention can be used for a great number of purposes, for example leading marking for navigation. A special application is to arrange two instruments spaced from one another for marking each its leading line, which lines intersect each other in a point. Such an arrangement can be used, for example, for docking-in or parking aircraft, in which case the pilot follows the leading line of one of the instruments to the point where he also is on the leading line of the second instrument, whereby the intended position for the aircraft is obtained.

The present invention, thus, renders possible a simple instrument, which has a uniform quality in respect of the interference patterns produced by various instruments, and which shows a leading line and, in addition, the correction direction in the case when the observer is not on the leading line. The attachment means, of course, can be varied, and the design of the screens can be altered without abandoning the idea of the invention.

The present invention, thus, must not be regarded restricted to the embodiments set forth above, but can be varied within the scope of the attached claims.

I claim:

1. An instrument for marking a leading plane by generating a moire pattern viewed by an observer of the instrument, said instrument comprising two screens arranged in opposing relationship for observation to form a front screen and a rear screen, each of said screens including parallel opaque lines separated by transparent interstices, said screens having differing distance between the respective opaque lines, wherein each of said screens is defined by a plate bent along a line of bend perpendicular to said opaque lines to define two screen portions forming an obtuse angle therebetween, said plates being joined by attachment means so that said respective lines of bend are parallel and the respective obtuse angles are positioned in opposing alignment, for producing a moire pattern forming arrowheads which point in the direction of motion required by the observer for approaching the leading plane.

2. The instrument of claim 1, wherein said obtuse angles are aligned facing one toward the other, and said front screen has a larger distance between said respective opaque lines than the respective distance between the opaque lines in said rear screen.

3. The instrument of claim 1, wherein said respective obtuse angles face away one from the other, and said front screen has a smaller distance between said respective opaque lines than the respective distance between the opaque lines in said rear screen.

4. The instrument of claim 1, wherein said attachment means comprise a pair of spaced sheets positioned parallel one with the other and perpendicular to the planes of the said screen portions, opposing side edges of said screen portions being clamped between said sheets, said sheets having securing means to secure said respective side edges therebetween.

5. The instrument of claim 4 wherein said securing means comprise pins projecting perpendicularly from said respective sheet.

6. The instrument of claim 1, wherein said obtuse angles are within the range of 120 to 170 degrees.

7. The instrument of claim 1, wherein each of said obtuse angles is approximately 145 degrees.

8. The instrument of claim 4, wherein said obtuse angles are within the range of 120 to 170 degrees.

9. The instrument of claim 4, wherein each of said obtuse angles is approximately 145 degrees.

10. The instrument of claim 1, wherein said line of bend is centrally located in each of said respective bent plates.

* * * * *